United States Patent

Terakado et al.

[11] Patent Number: 5,914,546
[45] Date of Patent: Jun. 22, 1999

[54] CONNECTION STRUCTURE OF A WIRE BUNDLING TERMINAL AND COIL LEADING-OUT WIRES, AND SMALL SIZE MOTOR AND ALTERNATOR FOR A VEHICLE USING THE CONNECTION STRUCTURE

[75] Inventors: Katsuyoshi Terakado, Urizura-machi; Shin Onose, Naka-machi; Takeshi Sakai; Yoshiaki Honda, both of Hitachinaka; Takehiko Watanabe, Naka-machi; Takashi Oguri; Kenji Ishihara, both of Hitachinaka, all of Japan

[73] Assignees: Hitachi, Ltd.; Hitachi Car Engineering Co., Ltd., both of Japan

[21] Appl. No.: 08/876,531

[22] Filed: Jun. 16, 1997

[30] Foreign Application Priority Data

Jun. 14, 1996 [JP] Japan .................................. 8-153703

[51] Int. Cl.[6] .............................. H01R 4/10; H02K 11/00
[52] U.S. Cl. .............................................. 310/71; 439/877
[58] Field of Search ................................... 310/71, 68 D; 439/874, 877

[56] References Cited

U.S. PATENT DOCUMENTS

| | | | |
|---|---|---|---|
| 3,805,221 | 4/1974 | Kuo | 439/877 |
| 4,354,133 | 10/1982 | Vig | 310/344 |
| 4,602,424 | 7/1986 | Kindig et al. | 29/596 |
| 4,902,867 | 2/1990 | Haramaki et al. | 219/85.18 |
| 5,229,674 | 7/1993 | Best | 310/71 |

FOREIGN PATENT DOCUMENTS

| | | |
|---|---|---|
| 2-137306 | 5/1990 | Japan . |
| 7-32555 | 4/1995 | Japan . |

*Primary Examiner*—Nestor Ramirez
*Assistant Examiner*—Judson H. Jones
*Attorney, Agent, or Firm*—Evenson, McKeown, Edwards & Lenahan, P.L.L.C.

[57] ABSTRACT

A highly reliable connection structure of a bundle of more than two coil leading-out wires and a wire bundling terminal is provided by contacting and fixing at least a part of a circumferential surface of each of the coil leading-out wires to an inside wall of the wire bundling terminal. Further, a small size motor and an alternator for a vehicle utilize the connection structure.

18 Claims, 8 Drawing Sheets

TERMINAL BAND MATERIAL FEEDING

FIG. 8B

CUTTING AND SHAPING

FIG. 8C

TERMINAL PART LOWERING

FIG. 8D

CAULKING

CONNECTION STRUCTURE OF A WIRE BUNDLING TERMINAL AND COIL LEADING-OUT WIRES, AND SMALL SIZE MOTOR AND ALTERNATOR FOR A VEHICLE USING THE CONNECTION STRUCTURE

BACKGROUND AND SUMMARY OF THE INVENTION

This application claims the priority of 8-153703, the disclosure of which is expressly incorporated by reference herein.

The present invention relates to a connection structure of a wire bundling terminal and coil leading-out wires, and a small size motor and an alternator for a vehicle using the connection structure which is very suitable for bundling and leading out a plurality of wires in an electrical device.

Hitherto, as disclosed in JP-A-13706/1990, a plurality of enameled leading wires in an electrical device are bundled and connected to each other in a connection terminal by heating the wires with brazing filler metal including phosphor.

In the above-mentioned technique, a bundle of coil leading-out wires are sandwiched by a terminal via brazing filler metal, and caulked as being electrically heated from the outside of the connection terminal.

Further, a structure of a stator in an alternator for a vehicle is shown in JP-A-32555/1995, in which plural leading-out wires from a center place (corresponding to the neutral point) of each of three phases are connected into one package by using a connection metal fitting. As a way for connecting the leading-out wires and the connection metal fitting, a welding method or a soldering method is used.

The above-mentioned conventional technique has high connection strength and heat-proofing property, and can connect the coil leading-out wires and the connection terminal into a package without removing the insulation coat of each wire, because the bundle of coil leading-out wires are sandwiched by a terminal via brazing filler metal, and caulked as being electrically heated from the outside of the connection terminal.

However, in this known technique, only a pair of two enameled wires of coil leading-out wires is treated. Because each coil leading-out wire is not sufficiently connected to the connection terminal in the case of a bundle of more than 2 coil leading-out wires, coil leading-out wires not sufficiently connected to the connection terminal possibly fall out of the terminal if the vibration is applied to the terminal, and the connection strength of other coils and the terminal is significantly decreased. Therefore, a connection terminal processed by this technique can not have high reliability.

In the above-mentioned later technique, plural coil leading-out wires are simply bundled and connected by heating. Consequently, each coil leading-out wire is not strongly fixed to the metal connection fitting. Moreover, the coil leading-out wires are not sufficiently adhered to each other.

Therefore, if the above-mentioned known techniques are used for a connection terminal at the neutral point part of an alternator for an vehicle in an engine room, and there exists at least one place of a coil leading-out wire not fixed to the connection terminal, the decomposition of the bundle connection is possibly caused and progresses to cause a conduction failure. Thus, high reliability of an alternator to which the above-mentioned technique is applied is not attained.

A first objective of the present invention is to provide a connection structure of a plurality of coil leading-out wires and a wire bundling terminal which has a stable connection force and high reliability.

A second objective of the present invention is to provide a small size motor or an alternator for a vehicle utilizing the connection structure to attain, with a plurality of coil leading-out wires and a wire bundling terminal, a stable connection force and the high reliability.

The first advantageous feature to attain the above objects of the present invention is the provision of the connection structure of a bundle of more than two coil leading-out wires and a wire bundling terminal, in which at least a part of a circumferential surface of each coil leading-out wire is contacted and fixed to an inside wall of the wire bundling terminal.

The second advantageous feature to attain the above mentioned objects of the present invention exists is the provision of a motor having a stator core of which at the circumferential part, a plurality of slots are provided, a stator coil being wound at each of the slots, and a wire bundling terminal for bundling a plurality of coil leading-out wires composed of more than two wires led from the stator coils, at an intermediate translating place. The coil leading-out wires are led out to the outside of the stator via the wire bundling terminal in which at least a part of a circumferential surface of each coil leading-out wire in at least a wire bundling terminal including more than two wires is contacted and fixed to an inside wall of the wire bundling terminal.

The third advantageous feature to attain the above mentioned objects of the present invention is the provision of an alternator having an armature core of which at the circumferential part, a plurality of slots are provided. A three-phase armature coil is wound at each of the slots, a rectifier rectifies outputs from the three-phase armature coils to direct current, a plurality of coil leading-out wires electrically connects the three-phase armature coils to the rectifier, and a wire bundling terminal bundles more than two coil leading-out wires led from the neutral point of the three-phase armature coils. The plurality of coil leading-out wires led from the neutral point is connected to one terminal of the rectifier via the wire bundling terminal in which at least a part of a circumferential surface of each coil leading-out wire in the wire bundling terminal is contacted and fixed to an inside wall of the wire bundling terminal.

In the above-described structure, it is currently deemed preferable that wires in at least a bundle composed of more than two coil leading-out wires are arranged in a zigzag manner, bundled by the wire bundling terminal, and adhered to each other and to an inside wall of the wire bundling terminal including the wires.

Further, it is currently deemed preferable that wires in at least a bundle composed of more than two coil leading-out wires are arranged together with crossover lines in a zigzag manner, bundled by the wire bundling terminal, and adhered to each other and to an inside wall of the wire bundling terminal including the wires.

Further, it is currently deemed preferable that each of wires in at least a bundle composed of more than two coil leading-out wires is metallurgically adhered to an inside wall of the wire bundling terminal including the wires, and the coil leading-out wires is connected to each other by pressure-welding.

Furthermore, it is currently deemed preferable that the connection among wires, and the connection between the wires and the wire bundling terminal, are processed by ohmic-resistance heating.

Another advantageous feature of the present invention is that it can be effectively used to connect a bundle composed of more than two coil leading-out wires led from the neutral point of three-phase coils and directly from the neutral point of three-phase, to the wire bundling terminal including the wires.

DETAILED DESCRIPTION OF THE DRAWINGS

Hereinafter, details of embodiments according to the present invention will be explained with reference to FIGS. 1–10 showing, for example, an application of the present invention to an alternator for a vehicle.

Figure 2:
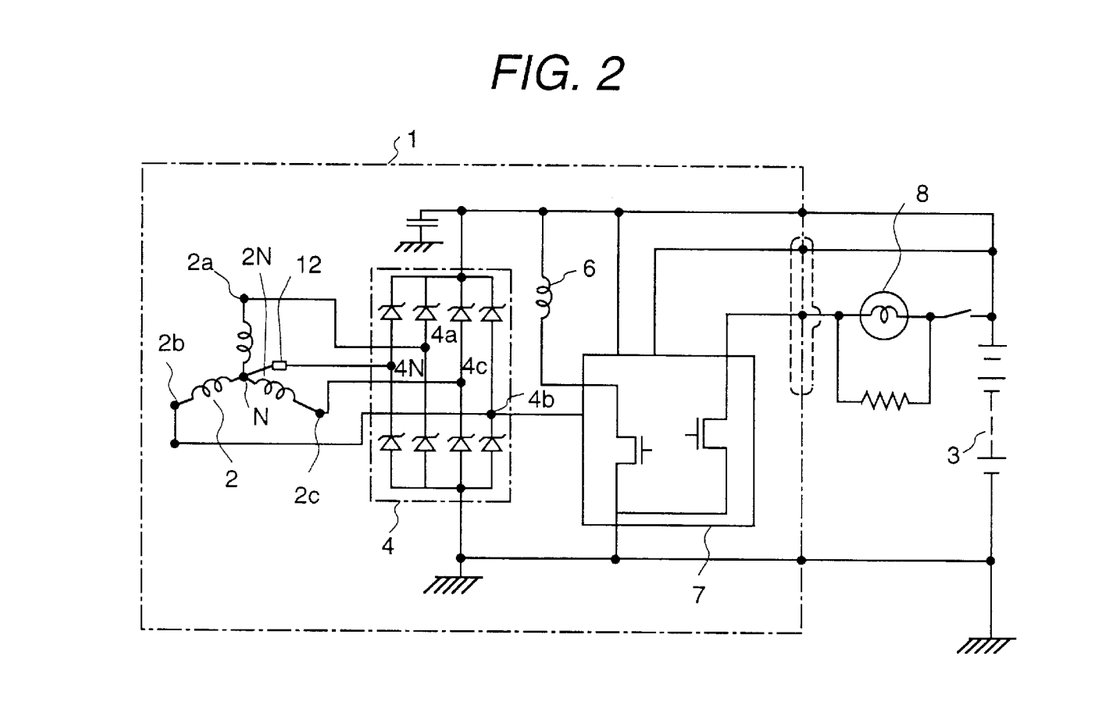
FIG. 2 is a circuit composition diagram of an alternator for a vehicle in accordance with an embodiment of the present invention.

In FIG. 2, a three-phase alternator 1 includes armature coils 2 of Y connection (stator connection coils), output terminals 2a, 2b and 2c of coil leading-out wires from the armature coils 2 and the neutral point N are connected to a full-wave rectifier 4, one terminal of the rectifier 4 being grounded and the other terminal of the rectifier 4 being connected to a battery 3. A field coil 6 is wound at a rotor 5 of the alternator shown in FIG. 3. The power generated by the alternator is adjusted, corresponding to a charging voltage state of the battery 3, by controlling current flowing in the field coil 6 with a voltage regulator 7. A charge lamp 8 is set so as to be turned on at the non-generation state of the alternator and turned off at the generation state of the alternator.

Figure 3:
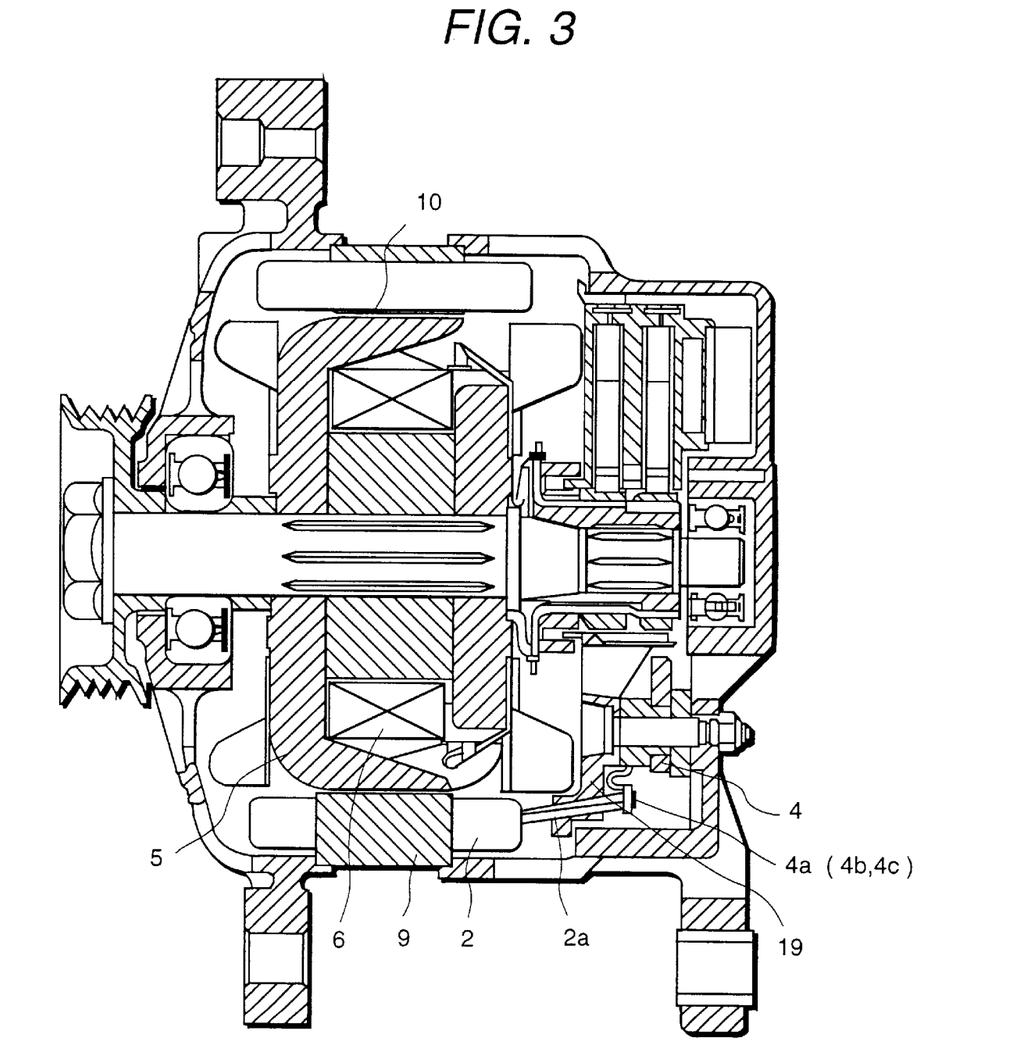
FIG. 3 is a longitudinal sectional view of the alternator shown schematically in FIG. 2.
Figure 4:
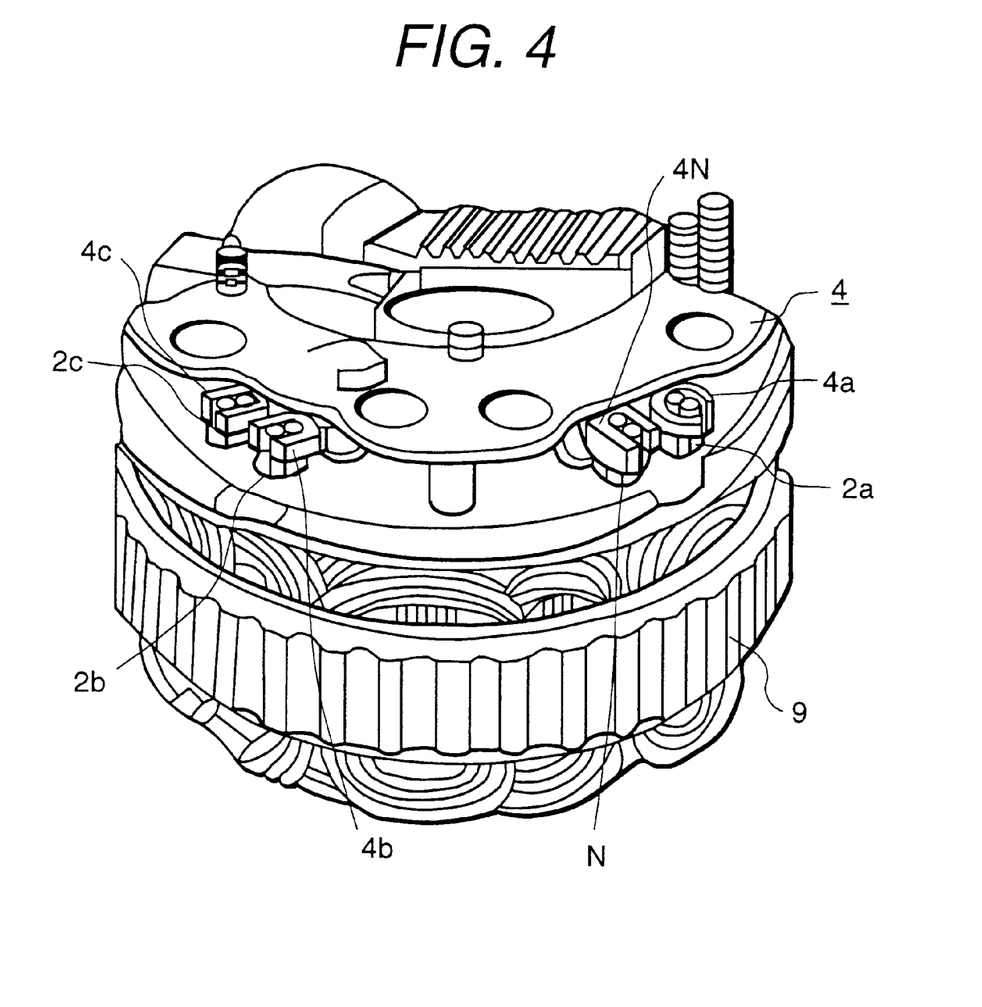
FIG. 4 is a perspective view of an armature core and a rectifier in the alternator shown in FIG. 3.
Figure 5A:
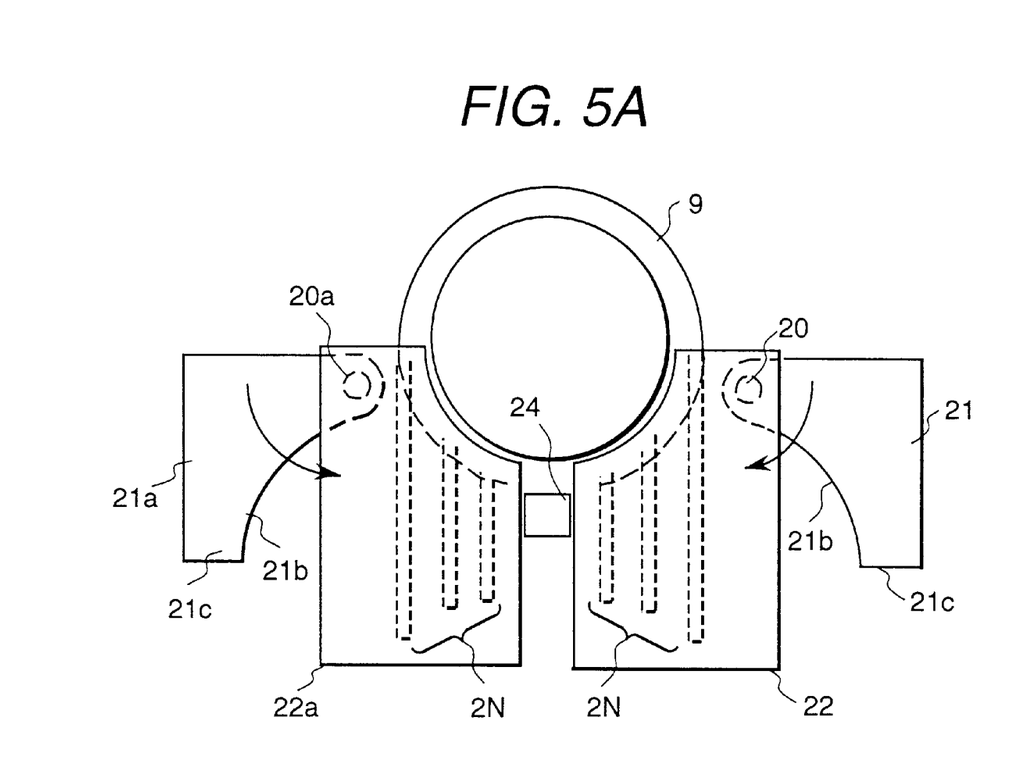
FIG. 5A is a plan view of a coil shaping apparatus for shaping a plurality of coil leading-out wires in the embodiment according to the present invention.
Figure 5B:
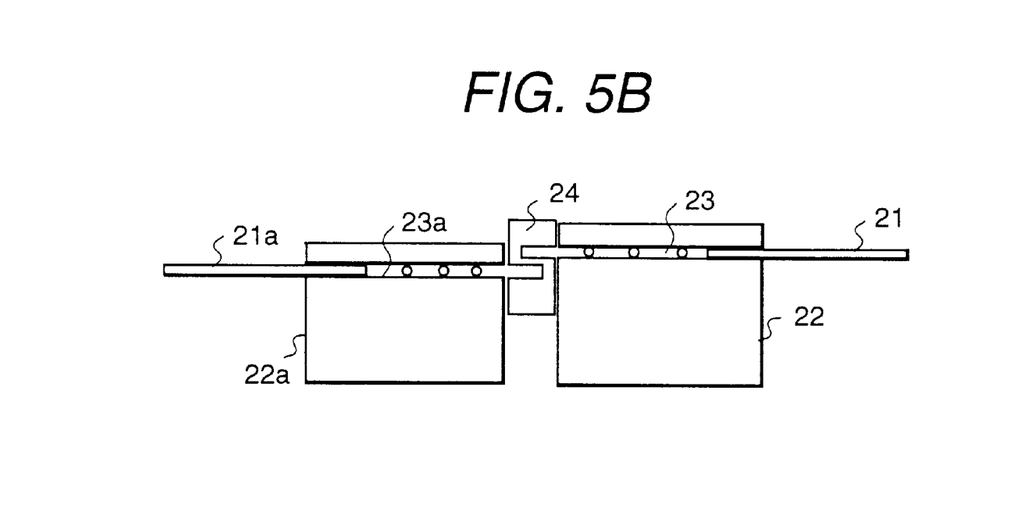
FIG. 5B is a side view of the coil leading-out wire shaping apparatus for shaping the plurality of coil leading-out wires in the embodiment according to the present invention.

The respective armature coils 2 are wound at the respective plural slots 10 provided in a circumferential part of a cylindrical armature core (stator core) as shown in FIG. 3, and the output terminals 2a, 2b and 2c of U phase, V phase and W phase coils, and the output terminal N of the neutral point, are connected to anode terminals 4a, 4b, 4c and 4N, respectively. The coil leading-out wires of the armature coils 2 are composed of pairs of two wires for each phase, and three pairs of two wires is directly connected to the anode terminals 4a, 4b and 4c, respectively. Three pairs of two wires from the neutral point of the respective U phase, V phase and W phase are gathered, and bundled together with the output terminal N of one wire from the neutral point, into a package by the wire bundling terminal 12.

Figure 1:
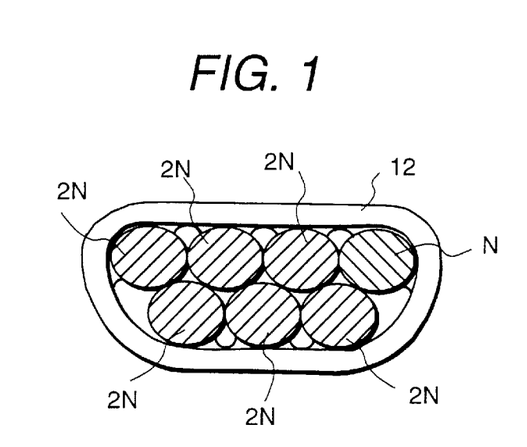
FIG. 1 is a sectional view showing a connection structure of a plurality of coil leading-out wires and a wire bundling terminal of an embodiment according to the present invention.

In FIG. 1, an arrangement of the six coil leading-out wires 2N from the neutral point and the output terminal or crossover line N of the neutral point in the wire bundling terminal 12 is explained below. Seven wires of the six coil leading-out wires 2N and the output terminal N are superimposed in two rows. Four wires including one wire of the output terminal N are put side by side in a lower row, and three wires are put similarly in an upper row. Further, the three wires in the upper row and the four wires in the lower row are arranged in a zigzag or offset manner so that one of the wires in the upper row does not contact one of the wires in the lower row, right vertically one to one, in the so-called zigzag manner as shown in FIG. 1. The wires of the coil leading-out wires arranged as mentioned above are bundled by the wire bundling terminal 12 made of metal including mainly copper via brazing filler metal 13, and electrically and mechanically connected to the wire bundling terminal. Further, the wires are pressed and contacted to each other.

A method of composing the wire bundling terminal 12 of the above-described wire arrangement is now explained.

An AIW (Amide Imide coated Wire) wire of an enameled conductive wire is usually used as each of the coil leading-out wires 2N extending from the neutral point of the armature coils 2, and copper alloy which is suitable to connection of AIW wires by using the ohmic-resistance heating, is used as the lead bundle terminal 12.

FIG. 5 through FIG. 10 show a method of connecting the coil leading-out wires and the wire bundling terminal 12. The output terminals 2a, 2b and 2c of the coil leading-out wires for U phase, V phase and W phase of the armature coils 2, each of which is wound at each of the slots provided at the armature core 9, and the coil leading-out wires 2N of the neutral point, are directed in the axis direction of the core. Therefore, to avoid the coil leading-out wires 2a, 2b and 2c for three phases from being mixed with the coil leading-out wires 2N, and to improve labor efficiency in assembling the alternator, the coil leading-out wires 2N of the neutral point are bent in the direction perpendicular to the axis direction in advance, as shown in FIG. 5A. The coil leading-out wires 2N of the neutral point, which are bent as mentioned above, are arranged in coil leading-out wire guiding spaces 23 and 23a respectively contained in a pair of right and left side wire bundling blocks 22 and 22a in which coil leading-out wire shaping blades 21 and 21a rotatably attached at support pins 20 and 20a, respectively. The wires arranged in the coil leading-out wire guiding spaces 23 and 23a are pressed and shaped along with the outer circumferential surface of the armature core 9, and inserted into an S-shaped bridge 24 (FIG. 5B) provided between the wire bundling blocks 22 and 22a. Further, each part of the wire shaping blades 21 and 21a facing the circumference of the armature core 9 has a circular arc surface 21b. The coil guiding spaces 23 and 23a are provided at the positions shifted in the axis direction, and both the coil guiding spaces 23 and 23a are opposite each other in the S-shaped bridge 24.

Figure 6A:
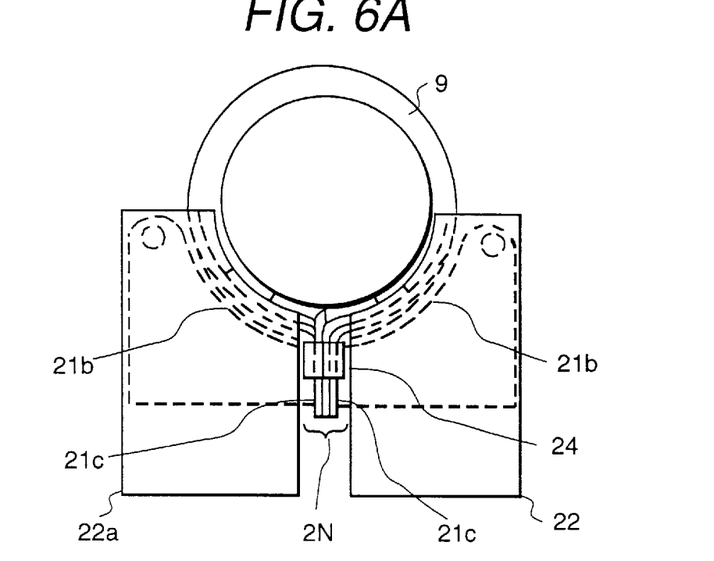
FIG. 6A is a plan view of the coil leading-out wires shaping apparatus at a state in which a wire shaping process has been finished.
Figure 6B:
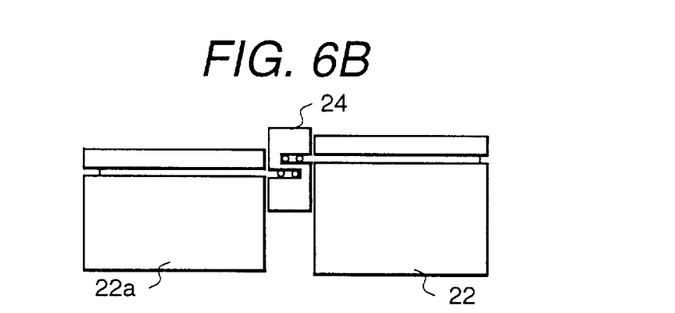
FIG. 6B is a side view of the coil leading-out wire shaping apparatus at a state in which a wire shaping process has been finished.

As shown in FIGS. 6A and 6B, the parts at the side of the armature core 9, of the coil leading-out wires 2N of the neutral point, are pressed by the shaping blades 21 and 21b, and shaped along with the circular arc surface part 21b of each of the shaping blades 21 and 21b. Each of two groups of the parts at the end side of the coil leading-out wires 2N of the neutral point are bent in the direction perpendicular to the axis of the armature core 9 and inserted, in a row, into each of grooves provided at the positions shifted each other in the axial direction, in the S-shaped bridge 24, by flat surface parts 21c of the shaping blades 21 and 21b.

Figure 7A:
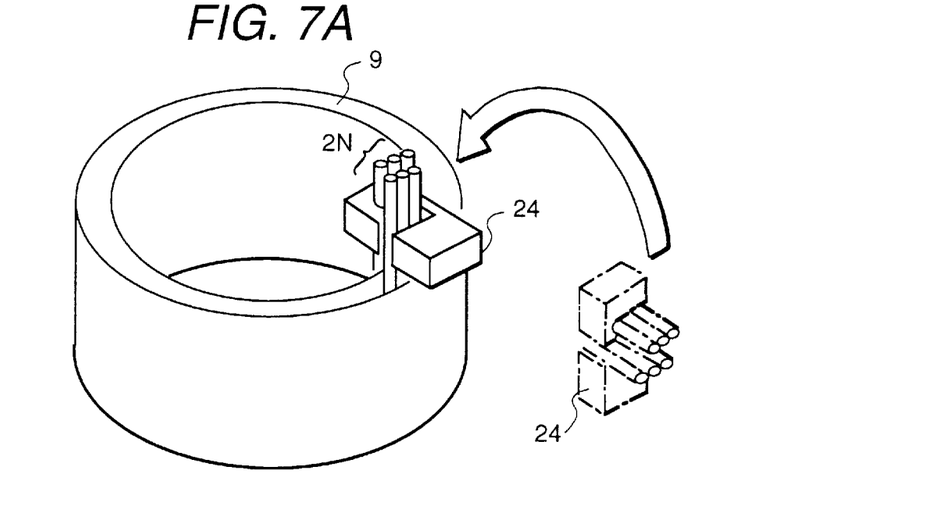
FIG. 7A is a perspective view of the coil leading-out wire shaping apparatus, further illustrating a process of changing the direction of the shaped coil leading-out wires from the radial direction to the longitudinal direction of a cylindrical core.
Figure 7B:
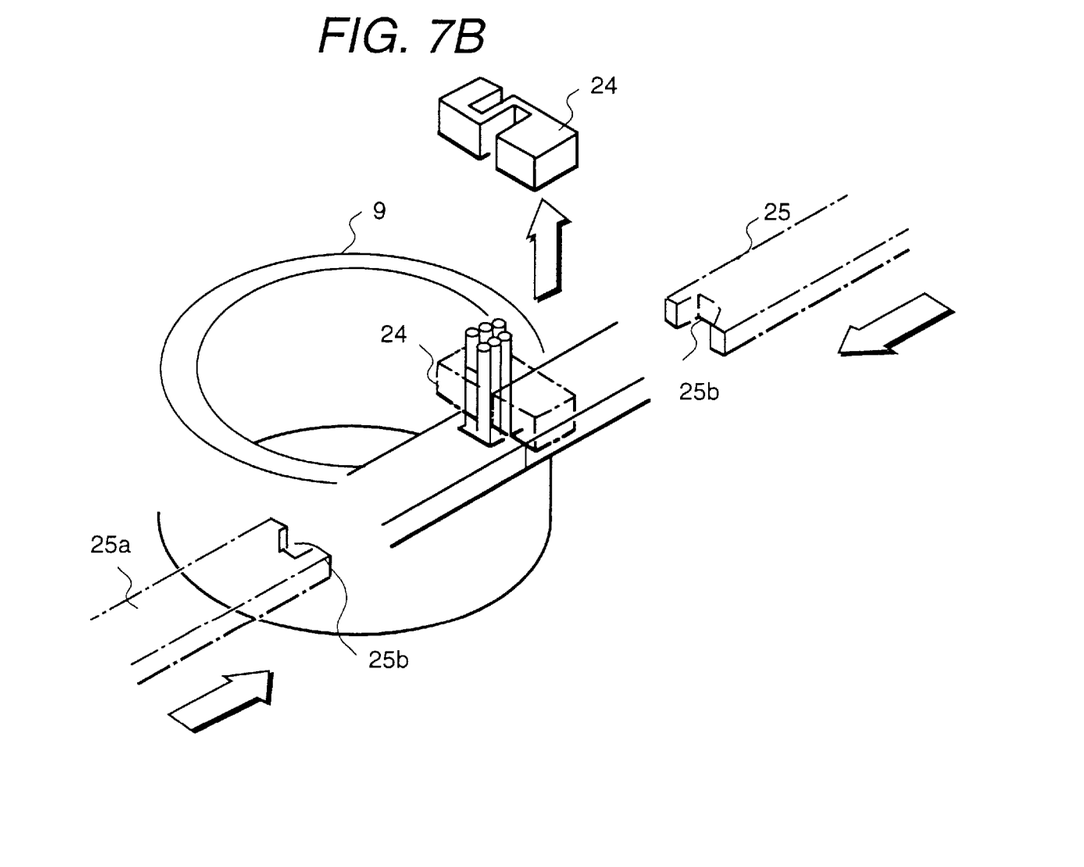
FIG. 7B is a perspective view of the coil shaping apparatus, further illustrating a process of removing a bridge for bundling the shaped coil leading-out wires and pressing the shaped wires.

Further, in the process shown in FIG. 7A, the S-shaped bridge 24 is bent or turned by a right angle in the axial direction parallel with the direction of the output terminals 2a, 2b and 2c, in order to make it easier to automatically assemble the alternator. Next, in the process shown in FIG. 7B, because removal of the S-shaped bridge 24 makes it difficult to keep the tightness of the bundle connection of the coil leading-out wires 2N of the neutral point, the S-shaped bridge 24 in which the coil leading-out wires 2N of the neutral point are inserted and arranged in two rows, is pressed from both sides and the coil leading-out wires 2N are closely contacted to each other, by a pair of chucks, each of the chucks having a shaping tooth 25b.

The coil leading-out wires 2N of the neutral point arranged in two rows and closely contacted are caulked together with the output terminal N of the wire from the neutral point, in a terminal band part, and the bundle of the coil leading-out wires 2N and N are strongly contacted to each other and to the terminal band part, as shown in a series of process shown in FIG. 8A–FIG. 8D.

Figure 8A:
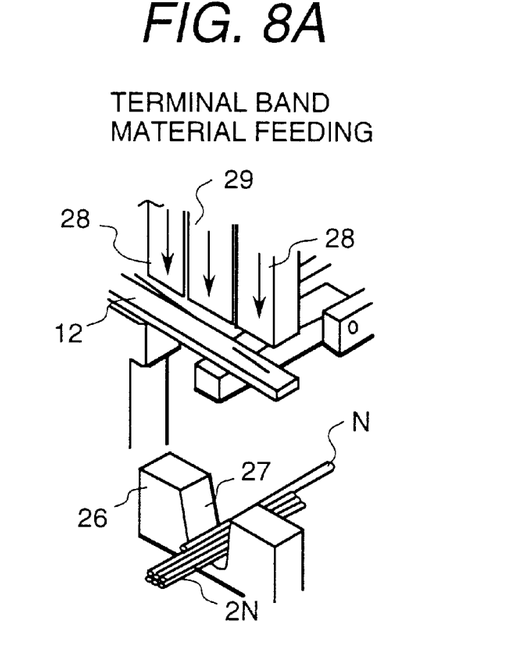
FIG. 8A is a perspective view of the coil leading-out wires shaping apparatus executing a process of feeding a terminal band material.
Figure 8B:
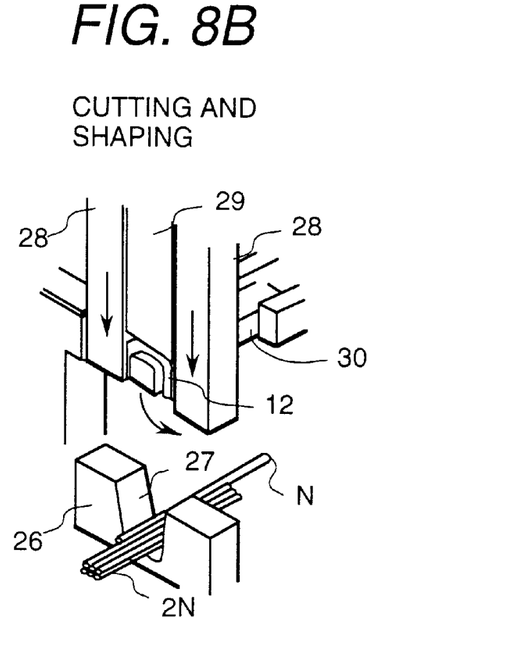
FIG. 8B is a perspective view of the coil leading-out wire shaping apparatus executing a process of cutting the terminal band material into a chip of a terminal part.
Figure 8C:
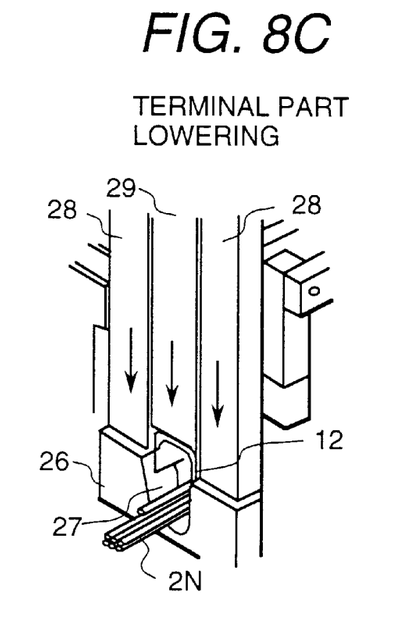
FIG. 8C is a perspective view of the coil leading-out wire shaping apparatus executing a process of lowering the cut terminal part.
Figure 8D:
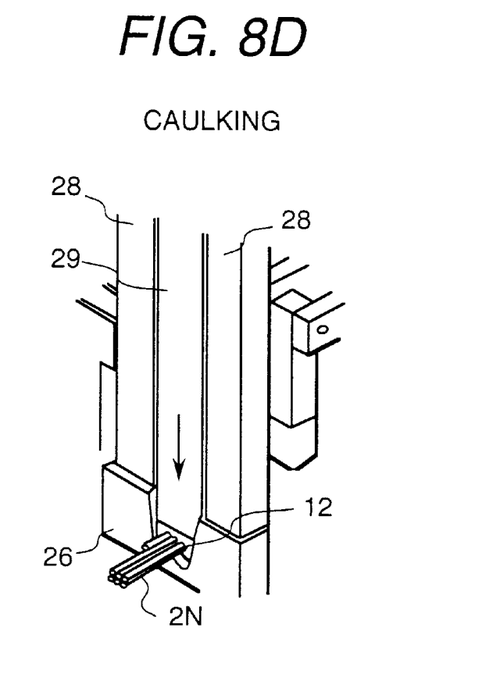
FIG. 8D is a perspective view of the coil leading-out wire shaping apparatus executing a process of caulking the lowered terminal part so as to envelop the pressed shaped wires.

In the process shown in FIG. 8A, a terminal band material 27 is fed after the bundle of the coil leading-out wires 2N of the neutral point and the output terminal N of the wire from the neutral point are placed at the bottom of the groove in an acceptance mold 26 having a trapezoidal groove. Further, in the process shown in FIG. 8B, the fed terminal band material 27 is cut out in the predetermined length by a cutter 28, and the cut out terminal band part is shaped into a U character shaped part by the cutter 28, a press mold 29 and a supporting mold 30. Further, in the process shown in FIG. 8C, the U character shaped terminal band part which is sandwiched and supported by the cutter 28 and the press mold 29 from both sides of the terminal band part, is lowered and pressed into the acceptance mold 26. Furthermore, in the process shown in FIG. 8D, the terminal band part is lowered and pressed by the press mold 29 so that the terminal band part envelopes the bundle of the coil leading-out wires 2N of the neutral point and the output terminal N of the wire from the neutral point. Further both the terminal band part and the wire bundle enveloped by the terminal band part are caulked and formed into the wire bundling terminal 12 in the first half processing step.

Figure 9:
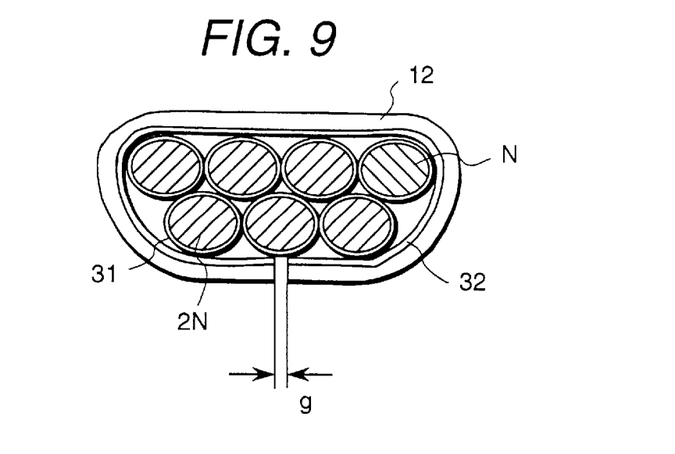
FIG. 9 is a sectional of the wire bundling terminal after receiving the caulking process.

In the above-mentioned first half processing step of producing the wire bundling terminal 12, the seven coils are also arranged in two rows in the zigzag or offset manner as shown in FIG. 9. Because enamel coats 31 of the coils and the brazing filler metal 32 exist in the above-mentioned first half step wire of the bundling terminal 12, a gap g is provided.

Figure 10A:
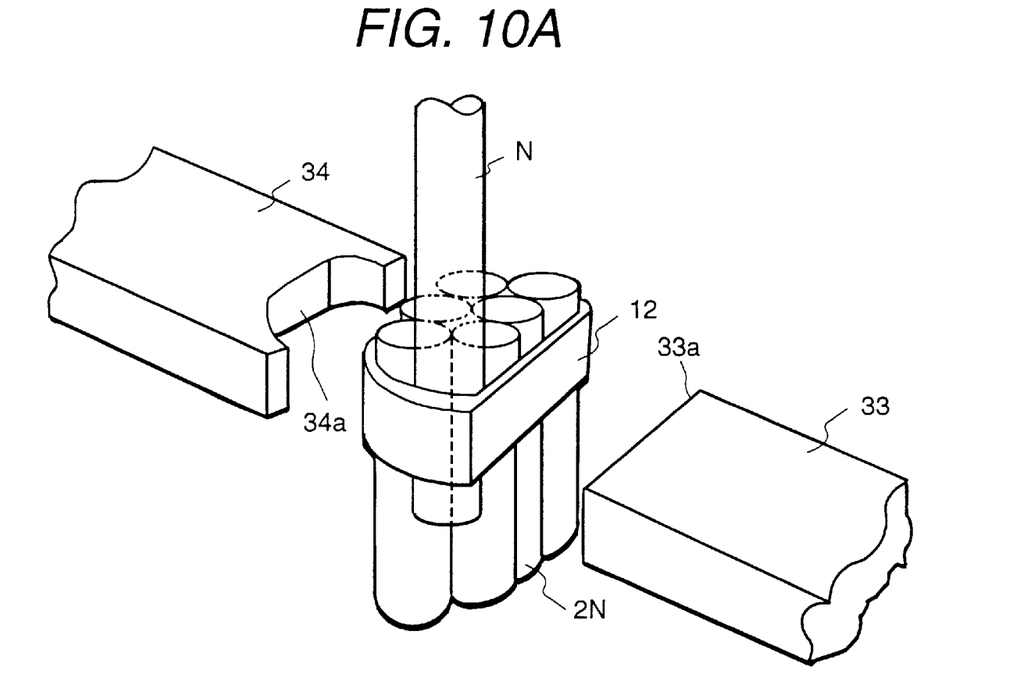
FIG. 10A is a perspective view of an ohmic-resistance heating apparatus before heating the caulked wire bundling terminal.
Figure 10B:
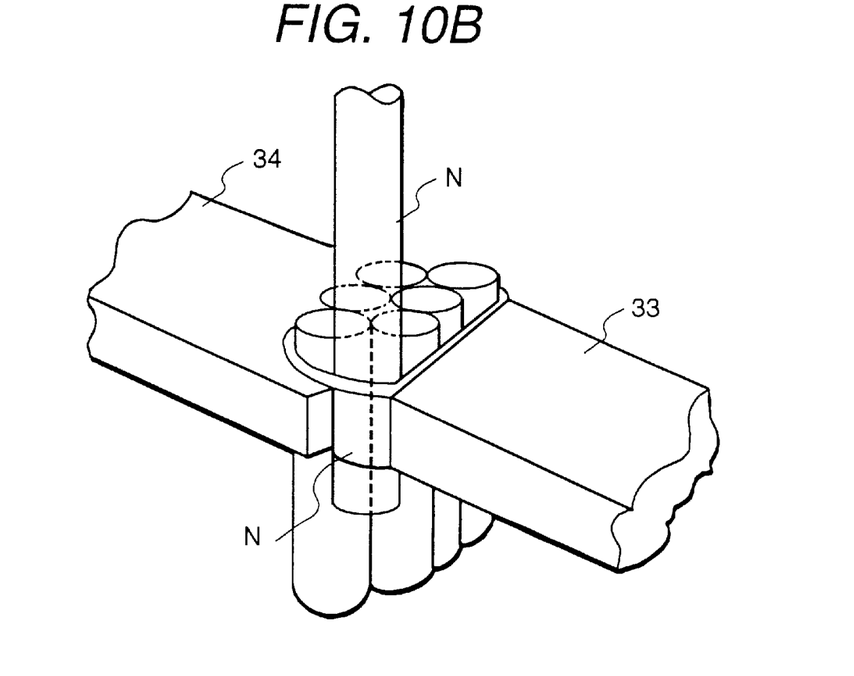
FIG. 10B is a perspective view of the ohmic-resistance heating apparatus during heating the caulked wire bundling terminal.

In FIG. 10A and FIG. 10B, the latter half processing step of producing the wire bundling terminal 12 is shown. The wire bundling terminal 12 produced in the first half processing step is pressed, and an electric current is applied to the wiring bundling terminal 12, by using an electrode 32 having a flat pressing surface and an electrode 33 having a concave pressing surface. The conditions of pressing and current applying are set so that the temperature of an inside wall of the wire bundling terminal exceeds the carbonization temperature of the coat material for the wires. As for the carbonization temperature, for example, that temperature of a heat-proof material coated wire (AIW) used for stator coils in an alternator for a vehicle is about 650° C. With the above-described current applying, surface coats of the coil leading-out wires 2N of the neutral point and the output terminal N of the wire from the neutral point, contacting the inside of the wire bundling terminal, are carbonized. Further, the carbonized enamel coats 30 are ejected from the gap g of the wire bundling terminal 12 by the pressing force of the electrodes 33 and 34, and conductor wires of 2N are exposed. The exposed conductor wires contacting the inside of the wire bundling terminal are further metallurgically connected to an inside wall of the terminal 2, and adhered to each other by the pressure welding effect. The connection in the wire bundling terminal 12 is secured by metallurgically fixing the coil leading-out wires 2N and the output terminal or cross-over line N of the wire from the neutral point, of each of which a part of a surface is adhered to the inside wall of the wire bundling terminal 12, to the terminal 12, and adhering the wires to each other by the pressure welding effect.

By using the above-mentioned method of composing a wire bundling terminal 12, the process of removing the enamel coats from the wires is omitted, and it is possible to certainly reduce the number of assembly steps and labor.

Further, if a conventional soldering method is applied to the connection of the coil leading-out wires including the output terminal of the wire from the neutral point, because the temperature of the neutral point part of the stator coils in the alternator for a vehicle increases to about 200° C. in the running state of the vehicle, the reliability of the connection is low due to the poor heat-proof property of solder. On the other hand, because the connection is carried out by using the metallurgical connection method in the present invention, the heat-proof quality of the connection is greatly improved, which considerably contributes to improving the reliability of the connection.

If copper phosphorus brazing filler metal is used as the brazing filler metal forming an inside layer of the wire bundling terminal, the reliability of the connection is further improved.

In the explanation of the present invention, although, as an example, the case that an enamel coated wire is used for the connection of coils, is mainly mentioned, it is more effective to connect wires of which enamel coats are removed in advance, to the wire bundling terminal via brazing filler metal. Further, the present invention is useful for increasing the strength of the connection of especially more than two coils, independently of a sectional shape of the wire bundling terminal and a shape of the connection part.

The wire bundling terminal of the present invention is effective not only to the electrical component explained in the embodiment, but also to an arrangement for bundling and tightly connecting more than two lead wires which can realize a strong connection force.

In the present invention, because at least a part of a surface of each of a bundled coil leading-out wires is contacted and fixed to the inside wall of the wire bundling terminal, the connection structure of coil leading-out wires and a wire bundling terminal has a stable connection force and high reliability. Thus, a small size motor and an alternator having the highly stable reliable connection structure of the wire bundling terminal can be achieved with the present invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A connection structure of a bundle coil leading-out wires and a wire bundling terminal, wherein said wires have unpeeled end coats, are prearranged in a zig-zag configuration, and are bundled and connected to each other so that at least a part of a circumferential surface of each of wires in at least a bundle composed of more than two coil leading-out wires is contacted and fixed to an inside wall of said wire bundling terminal.

2. A small size motor having a stator core of which at a circumferential part, a plurality of slots are provided, a stator coil being wound at each of said slots, and at least a wire bundling terminal for bundling a plurality of coil leading-out wires composed of more than two wires led from said stator coils, said coil leading-out wires being led out to the outside of said stator via said wire bundling terminal, wherein said wires have unpeeled end coats, are prearranged in a zig-zag configuration, and are bundled and connected to each other so that at least a part of a circumferential surface of each of wires in said bundle composed of more than two coil leading-out wires is contacted and fixed to an inside wall of said wire bundling terminal including said wires.

3. An alternator for a vehicle, having an armature core of which at a circumferential part, a plurality of slots are provided, a three-phase armature coil being wound at each of said slots, a rectifier for rectifying alternating current output from said three-phase armature coils to direct current, bundles of a plurality of coil leading-out wires, for electrically connecting said three-phase armature coils to said rectifier, and a bundle of more than two coil leading-out wires led from the neutral point of said three-phase armature coils, wherein at least a bundle composed of more than two coil leading-out wires are connected to a terminal of said rectifier via a wire bundling terminal for bundling said bundle of more than two coil leading-out wires, and said wires have unpeeled end coats, are prearranged in a zig-zag configuration, and are bundled and connected to each other so that at least a part of a circumferential surface of each of coil leading-out wire, in said bundle, led from the neutral point, is contacted and fixed to an inside wall of said wire bundling terminal including said wires.

4. A connection structure according to claim 1, wherein wires in at least a bundle composed of more than two coil leading-out wires are arranged together with crossover lines in a zigzag manner, and bundled by said wire bundling terminal including said wires.

5. A connection structure according to claim 1, wherein each of wires in at least a bundle composed of more than two leading-out wires is metallurgically fixed to an inside wall of said wire bundling terminal including said wires, and said wires are connected to each other by pressure-welding.

6. A connection structure according to claim 1, wherein wires in at least a bundle composed of more than two leading-out wires are connected to each other and to said wire bundling terminal including said wires by ohmic-resistance heating.

7. A connection structure according to claim 1, wherein wires in at least a bundle composed of more than two leading-out wires are coil leading-out wires led from the neutral point as to three-phase coils and directly from the neutral point of three-phase.

8. A connection structure according to claim 2, where wires in at least a bundle composed of more than two coil leading-out wires are arranged in a zigzag manner, and bundled by said wire bundling terminal including said wires.

9. A connection structure according to claim 3, where wires in at least a bundle composed of more than two coil leading-out wires are arranged in a zigzag manner, and bundled by said wire bundling terminal including said wires.

10. A connection structure according to claim 2, wherein wires in at least a bundle composed of more than two coil leading-out wires are arranged together with crossover lines in a zigzag manner, and bundled by said wire bundling terminal including said wires.

11. A connection structure according to claim 3, wherein wires in at least a bundle composed of more than two coil leading-out wires are arranged together with crossover lines in a zigzag manner, and bundled by said wire bundling terminal including said wires.

12. A connection structure according to claim 2, wherein each of wires in at least a bundle composed of more than two leading-out wires is metallurgically fixed to an inside wall of said wire bundling terminal including said wires, and said wires are connected to each other by pressure-welding.

13. A connection structure according to claim 3, wherein each of wires in at least a bundle composed of more than two leading-out wires is metallurgically fixed to an inside wall of said wire bundling terminal including said wires, and said wires are connected to each other by pressure-welding.

14. A connection structure according to claim 2, wherein wires in at least a bundle composed of more than two leading-out wires are connected to each other and to said wire bundling terminal including said wires by ohmic-resistance heating.

15. A connection structure according to claim 3, wherein wires in at least a bundle composed of more than two leading-out wires are connected to each other and to said wire bundling terminal including said wires by ohmic-resistance heating.

16. A connection structure according to claim 2, wherein wires in at least a bundle composed of more than two leading-out wires are coil leading-out wires led from the neutral point as to three-phase coils and directly from the neutral point of three-phase.

17. Method of assembling a motor stator core, comprising the steps of providing a plurality of slots at a circumferential part of the stator core, winding a stator coil at each of the slots, providing a wire bundling terminal for bundling a plurality of coil leading-out wires composed of more than two wires led from said stator coils, said wires have unpeeled end coats, being prearranged in a zig-zag configuration and being bundled and connected to each other, leading said coil leading-out wires outside of said stator via said wire bundling terminal, and contacting and fixing at least a part of a circumferential surface of each of the wires in said bundle to an inside wall of said wire bundling terminal.

18. Method of assembling an alternator armature core, comprising the steps of providing a plurality of slots at a circumferential part of the core, winding three-phase armature coils at said slots, providing bundles of a plurality of coil leading-out wires for electrical connection of said armature coils to a rectifier, leading a bundle of more than two coil leading-out wires from an armature neutral point of said armature coils, said wires have unpeeled end coats, being prearranged in a zig-zag configuration and being bundled and connected to each other, connecting at least a bundle composed of more than two coil leading-out wires to a rectifier terminal via a wire bundling terminal for bundling said bundle of more than two coil leading-out wires, and contacting and fixing at least a part of a circumferential surface of each coil leading-out wire led from the neutral point to an inside wall of said wire bundling terminal.

* * * * *